(No Model.)
J. MACPHAIL & G. WILCOX.
SPROCKET WHEEL.
No. 536,813. Patented Apr. 2, 1895.
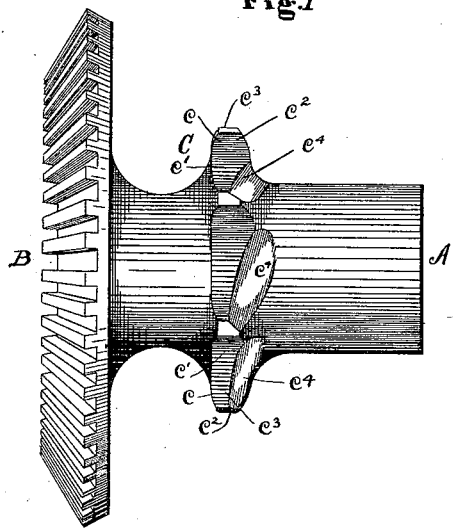
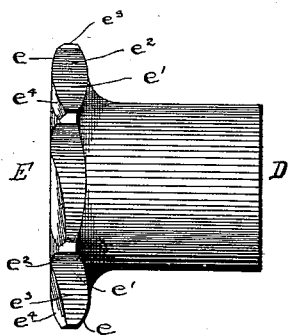
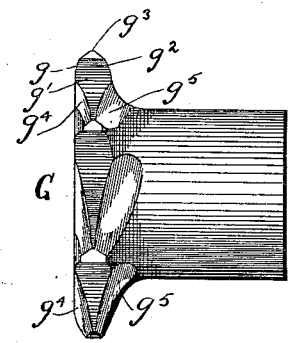
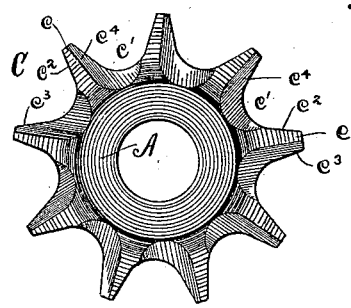
Witnesses
C. F. Blake
A. A. Murray
Inventors
James Macphail.
George Wilcox.
By Coburn & Thacher
Attys.

United States Patent Office.

JAMES MACPHAIL, OF BLUE ISLAND, AND GEORGE WILCOX, OF WEST PULLMAN, ASSIGNORS TO THE PLANO MANUFACTURING COMPANY, OF CHICAGO, ILLINOIS.

SPROCKET-WHEEL.

SPECIFICATION forming part of Letters Patent No. 536,813, dated April 2, 1895.

Application filed January 29, 1895. Serial No. 536,569. (No model.)

*To all whom it may concern:*

Be it known that we, JAMES MACPHAIL, residing at Blue Island, and GEORGE WILCOX, residing at West Pullman, in the county of Cook and State of Illinois, citizens of the United States, have invented a certain new and useful Improvement in Sprocket-Wheels for Chain-Gearing, which is fully set forth in the following specification, reference being had to the accompanying drawings, in which—

Figure 1 represents a side elevation of a short sleeve bearing a toothed gear wheel and a sprocket wheel embodying our invention; Fig. 2, a side elevation of the same, without the toothed wheel and showing the improvement differently applied to the chain gearing; Fig. 3, a similar view, showing still another form of the improvement; and Fig. 4, an end elevation of Fig. 1, with the toothed wheel removed, and looking in the direction of the arrow.

Our invention relates to toothed wheels which are in general use for chain gearing, being provided with projections or sprockets adapted to engage with the links of the chain. In these chain wheels of ordinary construction serious difficulty is encountered by the gradual filling up of the spaces between the teeth, especially if the atmosphere is not dry and in some instances if the ground is damp. Dirt, vegetable matter and other material will gradually accumulate in the spaces between the teeth and will be pressed down into the said spaces so that the latter will gradually be entirely filled with a hard mass and the chain links will slip over the ends of the wheel teeth without engaging therewith, thus stopping action. Our improvement is designed to overcome this defect and consists in beveling one or the other, or both, edges of the front or non-engaging surface of the teeth, with which provision the choking material will be driven down and out at one side instead of accumulating in the inter-spaces of the teeth, so that the said inter-spaces will be kept clean and no interference with the action of the gear wheel will occur.

We will now describe in detail the construction and operation of gearing embodying our invention, and will then state definitely in claims the improvements which we believe to be new and desire to secure by Letters Patent.

In the drawings, A, represents a revoluble sleeve of any ordinary description, such, for instance, as are used in mowing and grain harvesting machines in various locations. As shown in the drawings, this sleeve bears at one end a toothed bevel gear wheel, B, which is either in one piece with the sleeve, or fastened thereto, as desired, but is intended to turn with the sleeve, either to drive the latter or to itself drive some other device with which it is connected, through the rotation of the sleeve itself. On this sleeve, just inside of this toothed wheel, there is a sprocket or chain wheel, C, which may be either separate from or cast with the sleeve. In the former case, the toothed wheel must of course be fixed on the sleeve by any suitable means, this being a familiar expedient. In main features, this chain wheel is constructed as usual and consists of projections or sprockets, $c$, arranged at regular intervals around the rim or circumference of the wheel, with regular inter-spaces, $c'$, between them. In ordinary construction, both the side and cross-faces of these sprockets are substantially straight, so that, saving a slight taper usually employed, the cross-faces of these sprockets on each side of the inter-spaces will be practically of the same width from bottom to top. It is this construction which facilitates the filling up of the inter-spaces with dirt, grass, straw and other refuse material, which is caught by the chain as the links come down and engage in regular order with the respective sprockets on the wheel. The links press this refuse material directly down in the recesses, gradually filling up the latter with a hard chock, until finally the teeth are completely protected and the links cannot longer engage with them, when of course the driving action will be suspended. In order to prevent this accumulation of refuse material, we bevel or incline one or the other of the side-faces of the said sprockets adjacent to the cross-face of the respective faces, which is the non-working or non-engaging surface, as regards the links.

In Fig. 1 of the drawings the contact face of the sprockets is indicated by the letter $c^2$, and the non-engaging surface by the letter $c^3$. On the outer side-face of each sprocket, or, in other words, the face farthest from the bevel gear wheel, the material of each tooth or sprocket is cut away on a bevel from the non-engaging surface, forming a kind of beveled or inclined face, $c^4$, commencing well in near the upper edge of the sprocket face, inclining or curving gradually downward and outward, as seen in Figs. 1 and 4, the latter figure showing in elevation the entire series of inclines. Now, with this construction, when the chain gearing is in operation, as a link comes down and catches the contact face of one of the sprockets, the further action will cause the refuse material, if any is present, to be readily forced out along the said incline at the opposite face, and the sprocket wheel will be kept perfectly clean and clear. In the construction shown in Fig. 1, these inclines are shown on the side opposite to the bevel pinion. This is the preferable arrangement, because the sprocket wheel is so near the said bevel wheel that, if the inclines were upon the opposite face, the refuse would be turned in toward the bevel gear and in time clog up the space there. In case of a different arrangement, however, the incline may be made upon the other side of the teeth. Such a construction or arrangement is shown in Fig. 2, in which the sleeve, D, is shown without any bevel gear wheel, being simply a plain sleeve on which is a sprocket wheel, E, having teeth or sprockets, $e$, with inter-spaces, $e'$, contact or cross-face, $e^2$, and non-engaging surface, $e^3$, the same as in the construction shown in Fig. 1, but the incline, $e^4$, is made on the opposite side of the sprocket from that shown in Fig. 1, and would be on the side next to the bevel wheel in the latter, if there applied. There being nothing to obstruct the free discharge of the refuse material in this instance, however, the incline may be made upon the opposite side of the sprockets, as seen in Fig. 2, if desired.

In Fig. 3 another modification in construction is shown. The sleeve, F, is the same as the sleeve D, and is in like manner provided with a sprocket wheel, G, constructed with teeth or sprockets, $g$, inter-spaces, $g'$, contact cross-faces, $g^2$, and non-engaging surfaces, $g^3$, substantially the same as in the preceding figures, but, as shown in Fig. 3, the teeth or sprockets are provided with two bevels or inclines each, one on each side of the sprocket and indicated by the letters $g^4$ and $g^5$, for each pair of inclines on the respective sprockets. The general operation is the same in this construction as in either of the others described above, but the discharge of the refuse material from the inter-spaces is somewhat facilitated by the double inclines, and for some purposes and in some positions this double inclination construction may be preferable.

It will be understood that, as shown in the drawings, the sleeves are arranged horizontally, that is, they are to run with a horizontal axis.

We do not wish to be understood as limiting our improvement in its application to any particular chain gearing for any particular machine, but propose to apply it wherever it will be available and useful.

Obviously, this invention may be applied to the sprocket wheel on any revoluble journal, either a sleeve or tube, or a solid shaft. The particular construction of the sprocket wheel itself in other particulars and the accompanying mechanism are also features that are immaterial and may be variously modified.

Having thus described our invention, what we claim to be new, and desire to secure by Letters Patent, is—

1. In chain gearing, a revoluble sprocket wheel provided with a bevel or incline, on the side-faces of the respective teeth or sprockets, running from and cutting away part of the non-engaging surface of each sprocket, substantially as described.

2. In a chain gearing, a revoluble journal, A, in combination with a toothed gear wheel, B, fixed thereon, and a sprocket wheel, C, also fixed on said journal a little inside the said gear and provided with bevels or inclines, $c^4$, on the side-faces of the respective sprockets farthest from the said gear wheel and cutting away part of the respective non-engaging surfaces of each sprocket, substantially as described.

JAMES MACPHAIL.
GEORGE WILCOX.

Witnesses:
G. H. CARVER,
H. W. JONES.